United States Patent Office 2,999,100
Patented Sept. 5, 1961

2,999,100
PREPARATION OF DIHYDROVITAMINS $D_2$
Fritz von Werder, Darmstadt, Germany, assignor to E. Merck, Aktiengesellschaft, Darmstadt, Darmstadt, Germany
No Drawing. Filed Dec. 2, 1957, Ser. No. 699,924
Claims priority, application Germany Dec. 7, 1956
6 Claims. (Cl. 260—397.2)

When tachysterol$_2$ or vitamin $D_2$ is reduced with sodium a mixture of components is obtained from which it is difficult to separate the dihydrovitamins $D_2$ in pure form. Fernholz for example has reacted the mixture of components obtained by the reduction of vitamin $D_2$ with sodium and propyl alcohol with cyanic acid and has thus separated as allophanate the dihydrovitamin $D_2I$ which is best known as to its constitution. The manufacture of allophanates is inconveninet as a method of preparation especially if larger quantities are involved. The same author has also produced the 3,5-dinitro-benzoate of dihydrovitamin $D_2I$ (Liebig's Annalen, 499 page 200 (1932)). This ester which was also used by Schubert (Biochemische Zeitschrift, 328 pages 199–215 (1956)), has the disadvantage of a too high solubility in organic solvents. Fernholz has already pointed out that the m-dinitro benzoate of the dihydrovitamin $D_2I$ has a materially higher solubility than the vitamin $D_2$-3,5-dinitrobenzoate. In order to produce the dihydrovitamin $D_2II$, Fernholz saponified the residue of the mother liquor of dihydrovitamin $D_2I$ allophanate and esterified the resin thus obtained with 3,5-dinitro-benzoylchloride. The yield of dihydrovitamin $D_2II$-3,5-dinitro-benzoate was low.

Consequently, there is not available a practical method of isolating the dihydrovitamins $D_2$ from the mixture of components which are obtained from the reduction of tachysterol$_2$ or vitamin $D_2$.

It has now been found that the different dihydrovitamins $D_2$ can be isolated in a simple manner from the above described mixtures of components by separating them as esters of only in 3-position substituted benzoic acids, i.e., meta-substituted benzoic acids. The method according to the invention will now be described in detail.

The mixture of components which is formed by the reduction of tachysterol$_2$ or vitamin $D_2$ is esterified in a well-known manner with only in 3-position substituted (meta-substituted) benzoic acid derivatives, preferably, with m-nitrobenzoyl chloride or m-chlorobenzoyl chloride. For 1 mole of the mixture of the reduced compounds 1.1 to 1.5 moles, preferably 1.3 moles, of the benzoic acid derivatives are used. It is particularly advantageous to carry out the esterification at an elevated temperature i.e. within the range of 40 to 85° C., preferably from 60 to 75° C., and by adding a proton acceptor, as for instance, a tertiary organic base such as pyridine, quinoline, etc., and optionally in the presence of an inert solvent. In the absence of an inert solvent the reaction is preferably carried out at room-temperature. After consistently working up with acetone, the derivatives of the dihydrovitamin $D_2I$ crystallize out first, spontaneously, and then the ester of the dihydrovitamin $D_2II$ from the somewhat condensed mother liquors. By inoculating or seeding of the mother liquor of the dihydrovitamin $D_2$, the esters of dihydrovitamin $D_2IV$ can be isolated.

The following are examples in accordance with the invention. The weights are in grams (g.).

Example 1

360 g. of the resin obtained by reduction of vitamin $D_2$ with sodium
($[\alpha]_D$ in absolute alcohol
$= +45.9°$, $E^{1\%}_{1\,\text{cm.}}$ at $\lambda = 251$ m$\mu = 392$)

are dissolved in 1800 cc. of benzene, treated or mixed with 180 cc. of dry pyridine and a solution of 216 g. of m-nitrobenzoyl chloride in 540 cc. of benzene, whereby an elevation of the temperature occurs. The whole is heated for two hours to a bath temperature of 70° C. under the exclusion of the moisture. It is then diluted with ether after cooling, repeatedly washed with 5 percent hydrochloric acid, 5 percent caustic soda-solution, and water, dried over sodium sulphate, concentrated and withdrawn under vacuum. The residue is dissolved in 500 ccm. of hot acetone and the solution is stored at a cool temperature. A yield of about 200 g. is obtained in crystalline form and consists of nearly pure dihydrovitamin $D_2I$-m-nitrobenzoate and is purified by recrystallization from acetone. The ester consists of pale yellow crystals which melt at 108° C. and show for $[\alpha]_D$ in chloroform the value of $+32.1°$ and produce, after saponification with methyl alcoholic potassium hydroxide, crystallized dihydrovitamin $D_2I$.

From the slightly concentrated acetone mother liquor, about 34 g. of dihydrovitamin $D_2II$-m-nitrobenzoate crystallize out. The data of the ester purified by recrystallization from acetone are: melting point, 143–144° C., $[\alpha]_D$ in chloroform$=+149.2°$. Saponification with methyl alcoholic potassium hydroxide results in crystallized dihydrovitamin $D_2II$. After concentration of the ester mother liquor, and inoculating or seeding the same, smaller quantities of dihydrovitamin $D_2IV$-m-nitrobenzoate can be isolated. The substance is in the form of light green needles which melt, after recrystallization from acetone, at 154–155° C. and show for $[\alpha]_D$ in chloroform the value $+91°$.

Example 2

50 g. of starting material obtained from tachysterol$_2$ by reduction with sodium
($[\alpha]_D$ in absolute alcohol
$=+42.9°$, $E^{1\%}_{1\,\text{cm.}}$ at $\lambda = 251$ m$\mu = 410$)
are dissolved in 500 cc. of dry pyridine and mixed or treated with 29 g. of m-chlorobenzoyl chloride. After storing for 48 hours at room temperature the mixture is added dropwise to 5 kg. of 5 percent hydrochloric acid and the oily precipitate is taken up in ether. The purified ether extracts are washed with water, dried, concentrated and withdrawn under vacuum. The residue is dissolved in 76 cc. of hot acetone. After storing at a cool temperature, about 23 g. of dihydrovitamin $D_2I$-m-chlorobenzoate crystallize out which melt at 97–98° C. after being recrystallized from 4 volume parts of acetone and which show, for $[\alpha]_D$ in chloroform, the value, $+42.1°$.

From the concentrated starting mother liquor dihydrovitamin $D_2II$-m-chlorobenzoate in the form of colorless needles having a melting point of 131° C., $[\alpha]_D$ in chloroform$=+156.2°$, can be obtained and after inoculating or seeding dihydrovitamin $D_2IV$-m-chlorobenzoate in the form of colorless leaves having a melting point of 151–152° C. and showing the specific rotation in chloroform of $+94.5°$ can also be obtained.

It will be understood that the foregoing description of the invention and the examples set forth are merely illustrative of the principles thereof. Accordingly the appended claims are to be construed as defining the invention within the full spirit and scope thereof.

I claim:
1. Method of isolating dihydrovitamins $D_2$ from mixtures of reduction compounds formed by the reduction of a member of the group consisting of tachysterol$_2$ and vitamin $D_2$ which comprises esterifying the reduction compounds at a temperature in the approximate range of room temperature to 85° C. with a member of the group consisting of meta-nitrobenzoic acid, meta-chlorobenzoic acid and the acid chlorides of said acids in the presence of a member of the group consisting of pyridine and quinoline, separating the esters thus produced, and saponifying the said separated esters.

2. Method of isolating dihydrovitamins $D_2$ from mixtures of reduction compounds formed by the reduction of a member of the group consisting of tachysterol$_2$ and vitamin $D_2$ which comprises esterifying the reduction compounds at a temperature in the approximate range of room temperature to 85° C. with meta-nitrobenzoic acid in the presence of a member of the group consisting of pyridine and quinoline, separating the esters thus produced, and saponifying the said separated esters.

3. Method of isolating dihydrovitamins $D_2$ from mixtures of reduction compounds formed by the reduction of a member of the group consisting of tachysterol$_2$ and vitamin $D_2$ which comprises esterifying the reduction compounds at a temperature in the approximate range of room temperature to 85° C. with meta-nitrobenzoyl chloride in the presence of a member of the group consisting of pyridine and quinoline, separating the esters thus produced, and saponifying the said separated esters.

4. Method of isolating dihydrovitamins $D_2$ from mixtures of reduction compounds formed by the reduction of a member of the group consisting of tachysterol$_2$ and vitamin $D_2$ which comprises esterifying said reduction compounds at a temperature in the approximate range of room temperature to 85° C. with meta-chlorobenzoic acid in the presence of a member of the group consisting of pyridine and quinoline, separating the esters thus produced, and saponifying the said separated esters.

5. Method of isolating dihydrovitamins $D_2$ from mixtures of reduction compounds formed by the reduction of a member of the group consisting of tachysterol$_2$ and vitamin $D_2$ which comprises esterifying said reduction compounds at a temperature in the approximate range of room temperature to 85° C. with meta-chlorobenzoyl chloride in the presence of a member of the group consisting of pyridine and quinoline, separating the esters thus produced, and saponifying the said separated esters.

6. Method of isolating dihydrovitamins $D_2$ from mixtures of reduction compounds formed by the reduction of a member of the group consisting of tachysterol$_2$ and vitamin $D_2$ which comprises esterifying said reduction compounds with a member of the group consisting of meta-nitrobenzoic acid, meta-chlorobenzoic acid and the acid chlorides of said acids in the presence of a member of the group consisting of pyridine and quinoline, and in an inert solvent, at a temperature in the approximate range of room temperature to 85° C. separating the esters thus produced, and saponifying the said separated esters.

References Cited in the file of this patent

UNITED STATES PATENTS 2,862,934     Koevoet et al.     Dec. 2, 1958

OTHER REFERENCES

"Annalen der Chemie," Windaus, vol. 499 (1932), p. 200 relied on.